US011113010B2

(12) United States Patent
Domingo et al.

(10) Patent No.: US 11,113,010 B2
(45) Date of Patent: Sep. 7, 2021

(54) PRINTING USING FIDUCIAL MARKS

(71) Applicant: Hewlett-Packard Development Company, L.P., Houston, TX (US)

(72) Inventors: Xavier Domingo, Sant Cugat del Valles (ES); Li Qian, Sant Cugat del Valles (ES); Secundino Vicente Vicente, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 649 days.

(21) Appl. No.: 16/074,405

(22) PCT Filed: May 16, 2016

(86) PCT No.: PCT/US2016/032648
§ 371 (c)(1),
(2) Date: Jul. 31, 2018

(87) PCT Pub. No.: WO2017/200520
PCT Pub. Date: Nov. 23, 2017

(65) Prior Publication Data
US 2021/0191670 A1   Jun. 24, 2021

(51) Int. Cl.
*G06F 3/12* (2006.01)

(52) U.S. Cl.
CPC ........... *G06F 3/1208* (2013.01); *G06F 3/125* (2013.01); *G06F 3/1234* (2013.01)

(58) Field of Classification Search
CPC ...... G06F 3/1208; G06F 3/1234; G06F 3/125; B41J 11/0095; B41J 11/46; B41J 29/393; B41J 3/60; G06K 15/021; G06K 15/023
See application file for complete search history.

(56) References Cited

U.S. PATENT DOCUMENTS 6,861,186 B1   3/2005 Pagette et al.
8,570,606 B2  10/2013 Baeumler
(Continued)

FOREIGN PATENT DOCUMENTS

DE   102007040402   3/2009
WO   WO-2015147820  10/2015

OTHER PUBLICATIONS

HP, "Second-Generation HP Latex Inks Cut Production Times and Media Costs for Double-Sided Printing", Idea Print Solutions, Oct. 2011, 2 pages, Hewlett-Packard Development Company, L.P.
(Continued)

*Primary Examiner* — Iriana Cruz
(74) *Attorney, Agent, or Firm* — HP Inc. Patent Department

(57) ABSTRACT

Examples herein provide a method, which includes printing an image and fiducial marks on a first side of a print medium. The fiducial marks include first marks ahead of the image, wherein two of the first marks are end marks at a first distance from respective opposite edges of the print medium, and each first mark has a first length and is located at a second distance from a beginning edge of the image. The fiducial marks also include second marks along a length of the print medium, wherein each second mark is at the first distance from the respective opposite edges, has a second length smaller than the first length, and is at a third distance from another second mark. The method includes scanning the fiducial marks and printing a registered mirrored copy of the image on the second side of the print medium using the scanned fiducial marks.

15 Claims, 10 Drawing Sheets

(56) References Cited

U.S. PATENT DOCUMENTS

| | | |
|---|---|---|
| 8,960,842 B2 | 2/2015 | Piatt et al. |
| 9,067,435 B2 | 6/2015 | Richmond et al. |
| 9,108,435 B2 | 8/2015 | Rossell et al. |
| 9,211,751 B2 | 12/2015 | Platt et al. |
| 2010/0296117 A1* | 11/2010 | Dobbertin .............. G03G 15/60 358/1.15 |
| 2011/0164293 A1 | 7/2011 | Eom |
| 2011/0194131 A1 | 8/2011 | Hunter et al. |
| 2013/0293413 A1 | 11/2013 | Berel |
| 2013/0293613 A1 | 11/2013 | Berel |
| 2013/0328994 A1 | 12/2013 | Marttila |
| 2014/0096696 A1 | 4/2014 | Deis et al. |
| 2014/0326152 A1 | 11/2014 | Gartner et al. |
| 2015/0210099 A1* | 7/2015 | Barron .................... B41J 11/46 347/10 |

OTHER PUBLICATIONS

Unknown, "Jeti Mira a Versatile Printing Solution", AGFA brochure, Aug. 17, 2015, Great Britain, 8 pages.

Unknown, webpage, Print Media Technology, http://print-media-technology.blogspot.in/, Apr. 22, 2016, 3 pages.

* cited by examiner

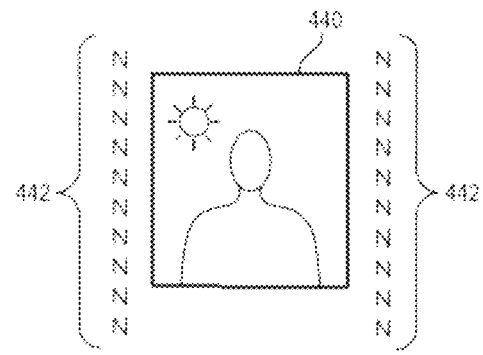
*Fig. 4A*
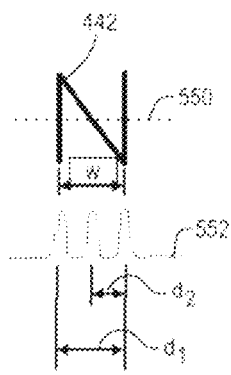   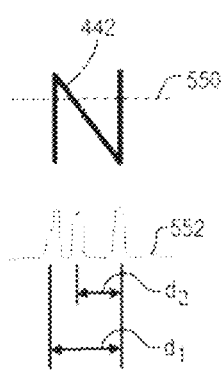   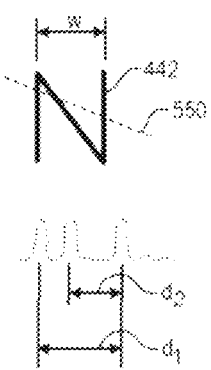
*Fig. 4B*     *Fig. 4C*     *Fig. 4D*
Fig. 4

| | |
|---|---|
| Printing an image and fiducial marks on a first side of a print medium, wherein the fiducial marks comprise:<br><br>    a set of first marks ahead of the image, wherein two of the first marks are end marks at a first distance from respective opposite edges of the print medium, and each of the first marks has a first length and is located at a second distance from a beginning edge of the image; and<br><br>    a set of second marks along a length of the print medium, wherein each of the second marks is at the first distance from the respective opposite edges, has a second length smaller than the first length, and is at a third distance from another second mark | S701 |
| Scanning, using a sensor, the fiducial marks while the fiducial marks are backlit by a light source | S702 |
| Printing a registered mirrored copy of the image on the second side of the print medium using respective relative positions of at least some of the scanned fiducial marks to the image | S703 |

Fig. 7

| | |
|---|---|
| Printing an image and fiducial marks on a first side of a print medium, wherein the fiducial marks comprise:<br><br>    a set of first marks ahead of the image, wherein each of the first marks has a first length and is located at a second distance from a beginning edge of the image, wherein two of the first marks are end marks at a first distance from respective opposite edges of the print medium, wherein the remaining first marks of the set are arranged as an array along a width of the print medium, and wherein the first marks in the array are separated from each other, as well as the first of the array separate from one of the end marks, by a fourth distance; and<br><br>    a set of second marks along a length of the print medium, wherein each of the second marks is at the first distance from the respective opposite edges, has a second length smaller than the first length, and is at a third distance from another second mark | S901 |
| Scanning, using a sensor, the fiducial marks while the fiducial marks are backlit by a light source | S902 |
| Printing a registered mirrored copy of the image on the second side of the print medium using respective relative positions of at least some of the scanned fiducial marks to the image | S903 |

Fig. 9

PRINTING USING FIDUCIAL MARKS

BACKGROUND

Some signs or billboards are designed to be viewed both during the day and during the night, During the day, the illumination for the sign is generally daylight reflecting off the front surface of the sign. On the other hand, at night the signs are generally illuminated with a light source. Some signs may be illuminated with a light source that mimics daylight by directing light towards the front surface of the sign. Other signs may be backlit with a light source that is behind the sign that directs light through the sign.

BRIEF DESCRIPTION OF THE DRAWINGS

The drawings are provided to illustrate various examples of the subject matter described herein in this disclosure (hereinafter "herein" for short, unless explicitly stated otherwise) related to methods and apparatuses for printing using fiducial marks and are not intended to limit the scope of the subject matter. The drawings are not necessarily to scale.

FIGS. 4A-4D are schematics showing an example of the printing on side A with fiducial marks: 4A shows an example of the print on side A; 4B-4D show different examples of a fiducial mark being scanned.

FIG. 7 is a flowchart illustrating, in one example, the processes involved in printing using fiducial marks.

FIG. 9 is a flowchart illustrating, in another example, the processes involved in printing using fiducial marks.

DETAILED DESCRIPTION

Figure 1:
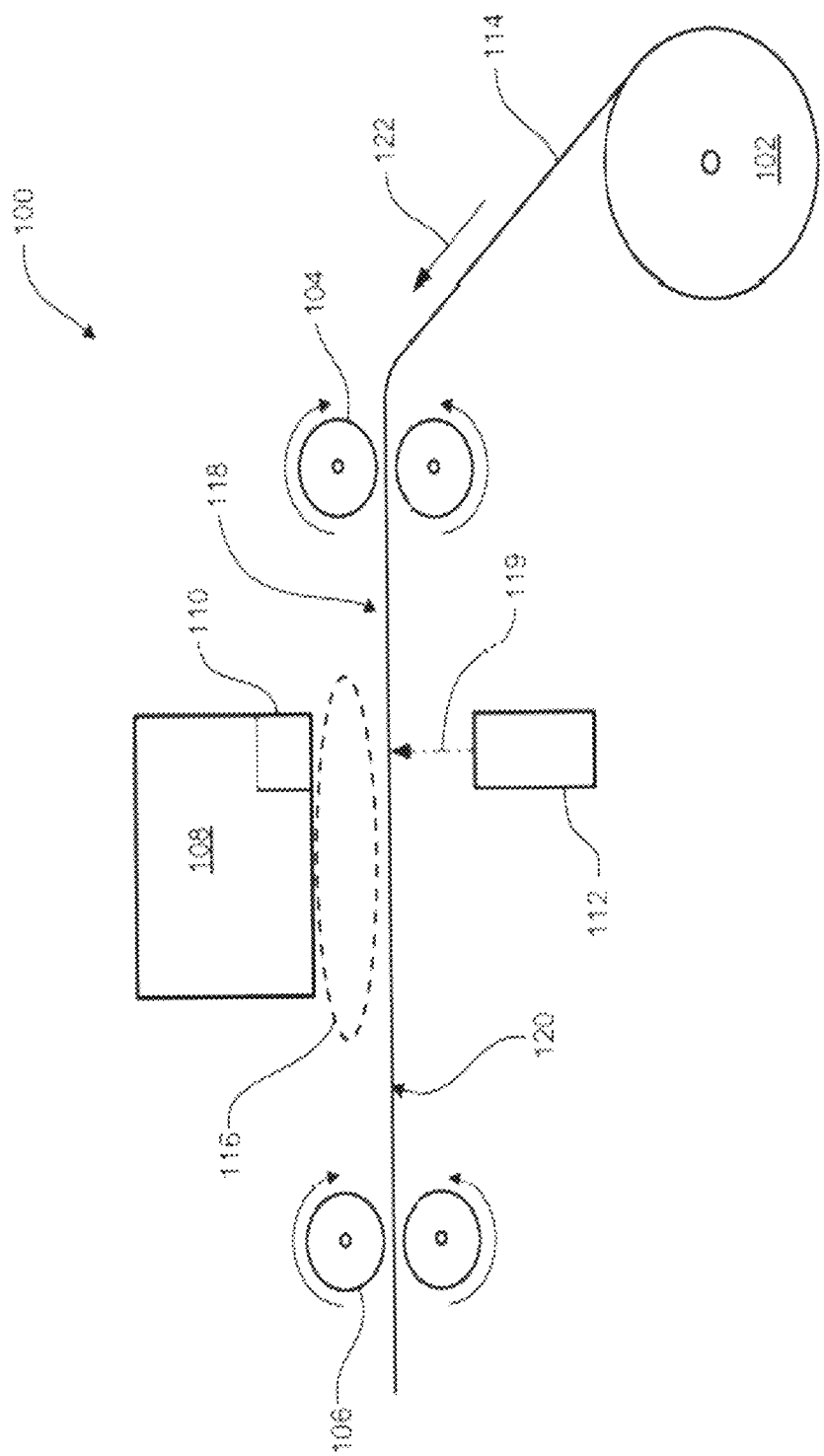
FIG. 1 is a schematic showing a side view of an example printer as described herein.

Signs or billboards that are used both during the day and night are known as "day and night" (or "D&N") signs. When printing on a print medium for a D&N sign, the same image is printed on the front side and the back side of the medium with the back image being a mirrored copy of the front side image. Back-lit signs may have an image printed on the front side of the sign and a mirrored copy of the image printed on the back side of the sign. When viewed during the day the front image is seen. When viewed at night the final image seen is a combination of the image printed on the back side of the sign and the image printed on the front side of the sign. When the image printed on the front side is not aligned (or not "registered") with the image printed on the back side, the combined image viewed at night may have quality issues—e.g., blurred edges or other visual defects.

In view of the aforementioned challenges related registration, the Inventors have recognized and appreciated the advantages of printing using fiducial marks. Following below are more detailed descriptions of various examples related to printing apparatuses and methods, particularly those involving fiducial marks. The various examples described herein may be implemented in any of numerous ways.

One example described herein provides a method for printing with a layout of fiducial marks (or "fiducials" or "marks" for short) that may facilitate registration during double-sided D&N printing, including multi-copy and multi-job printing. Another example described herein provides a method for automatic measurement for deformation of a print medium using a row of fiducial marks with a light sensor.

Provided in one aspect of the examples is a method, comprising: printing an image and fiducial marks on a first side of a print medium, wherein the fiducial marks comprise: a set of first marks ahead of the image, wherein two of the first marks are end marks at a first distance from respective opposite edges of the print medium, and each of the first marks has a first length and is located at a second distance from a beginning edge of the image; and a set of second marks along a length of the print medium, wherein each of the second marks is at the first distance from the respective opposite edges, has a second length smaller than the first length, and is at a third distance from another second mark; scanning, using a sensor, the fiducial marks while the fiducial marks are backlit by a light source; and printing a registered mirrored copy of the image on the second side of the print medium using respective relative positions of at least some of the scanned fiducial marks to the image.

Provided in another aspect of the examples is a method, comprising: printing an image and fiducial marks on a first side of a print medium, wherein the fiducial marks comprise: a set of first marks ahead of the image, wherein each of the first marks has a first length and is located at a second distance from a beginning edge of the image, wherein two of the first marks are end marks at a first distance from respective opposite edges of the print medium, wherein the remaining first marks of the set are arranged as an array along a width of the print medium, and wherein the first marks in the array are separated from each other, as well as the first of the array separated from one of the end marks, by a fourth distance; and a set of second marks along a length of the print medium, wherein each of the second marks is at the first distance from the respective opposite edges, has a second length smaller than the first length, and is at a third distance from another second mark; scanning, using a sensor, the fiducial marks while the fiducial marks are backlit by a light source; and printing a registered mirrored copy of the image on the second side of the print medium using respective relative positions of at least some of the scanned fiducial marks to the image.

Provided in another aspect of the examples is a non-transitory machine-readable medium stored thereon machine executable instructions, which when executed by a machine, performs a method comprising: printing an image and fiducial marks on a first side of a print medium, wherein the fiducial marks comprise: a set of first marks ahead of the image, wherein two of the first marks are end marks at a first distance from respective opposite edges of the print medium, and each of the first marks has a first length and is located at a second distance from a beginning edge of the image; and a set of second marks along a length of the print medium, wherein each of the second marks is at the first distance from the respective opposite edges, has a second length smaller than the first length, and is at a third distance from another second mark; scanning, using a sensor, the fiducial marks while the fiducial marks are backlit by a light source; and printing a registered mirrored copy of the image on the second side of the print medium using respective relative positions of at least some of the scanned fiducial marks to the image.

To the extent applicable, the terms "first," "second," "third," etc. herein are merely employed to show the respective objects described by these terms as separate entities and are not meant to connote a sense of chronological order, unless stated explicitly otherwise herein.

Printing Apparatus

Double-sided D&N printing is a printing technique that allows a user to print an image on both sides of a printing substrate (or "print medium") with low misregistration error. The term "registration" in the context of double-sided D&N printing as descried herein refers to the image on the first side ("side A") of the print medium aligned with the mirrored copy thereof on the second side ("side B"), so that the combined image looks the same under both the black-lit condition (i.e., at night) and the front-lit, normal ambient condition (i.e., during the day). As described further below, several factors may contribute to the misalignment.

In one example, a printer prints an image of at least one fiducial mark on the first side of a print medium. The medium will be flipped over and a mirrored copy of the first image is printed on the second side of the medium. The mirrored copy of the image printed on the second side is aligned to the image on the first side using the fiducial mark(s) printed on the first side. The aligned images of the first and second sides are considered "registered."

In this example, the printer may locate the fiducial mark(s) using a sensor that looks through the medium to locate the fiducial mark(s) on the first side when the second side is being printed. The sensor may locate the fiducial mark(s) through the medium because a media path runs between the sensor and a light source. Because the print medium is between the light source and the sensor, the light source backlights the medium allowing the sensor to locate the fiducial mark(s). Once the second side has been printed, the fiducial mark(s) may be trimmed off, leaving only the images printed on both sides of the medium.

FIG. 1 is a schematic showing a side view of an example printer 100. Printer 100 comprises a media source 102, a pair of pinch rollers 104, a pair of take-up rollers 106, a print engine 108, a sensor 110, a light source 112 and a print medium 114. A media path runs from the media source 102, between the pair of pinch rollers 104, underneath the print engine 108, and between the pair of take-up rollers 106. The print medium 114 is shown in the media path. During printing the print medium 114 travels along its length in a printing direction as shown by arrow 122. A print zone 116 is underneath the print engine 108. A "print zone" herein may refer to the location where printing fluid from the print engine is deposited onto the print medium 114. "Printing fluid" herein may refer to any liquid that is deposited by the print engine and may comprise black ink, colored inks, gloss, pre-treatment fluids, finishing fluids, and the like.

In this example, sensor 110 is located on the print engine 110. In other examples, the sensor may be located in a different position, for example adjacent to the print engine. Sensor 110 may be any suitable sensor that detects light intensity—e.g., a charged coupled device ("CCD"). Print medium 114 has a first side 118 (i.e., side A) and a second side 120 (i.e., side B). The first side 118 of the print medium is facing the print engine 108. Sensor is located above the first side 118 of the print medium 114.

Light source 112 is located below the sensor 110 facing the second side 120 of the print medium 114 such that the media path travels between the sensor 110 and the light source 112. Light 119 from the light source is directed towards the sensor. Light 119 from the light source 112 travels through the print medium 114 towards the sensor 110. Because the light travels through the print medium 114, the light 119 backlights the print medium such that the sensor may detect images and/or fiducial marks printed from the second side 120 of the medium.

The print medium 114 may be "day and night" medium. D&N media in some instances are known as banner media. A D&N print medium herein may comprise a translucent material and/or be translucent. In one example, a D&N print medium is between 50% and 95% opaque, for example 90% opaque. Other values are also possible. D&N media may be in a roll or web containing 50 meters or more of material, but also may be as sheets of media. D&N media may comprise any suitable material. For example, the media may comprise a polymer. In one example, the print medium comprises polyvinyl chloride ("PVC"). In another example, the print medium comprises polyethylene terephthalate ("PET") and/or polyproplyene ("PP"). In another example, the print medium comprises paper. In another example, the print medium comprises a banner comprising clothes. Other suitable materials may also be used. D&N media may have any suitable thickness. In one example, print medium has a thickness of between about 0.5 mm and about 2.0 mm, for example about 1.0 mm. Other vales are also possible.

Figure 2:
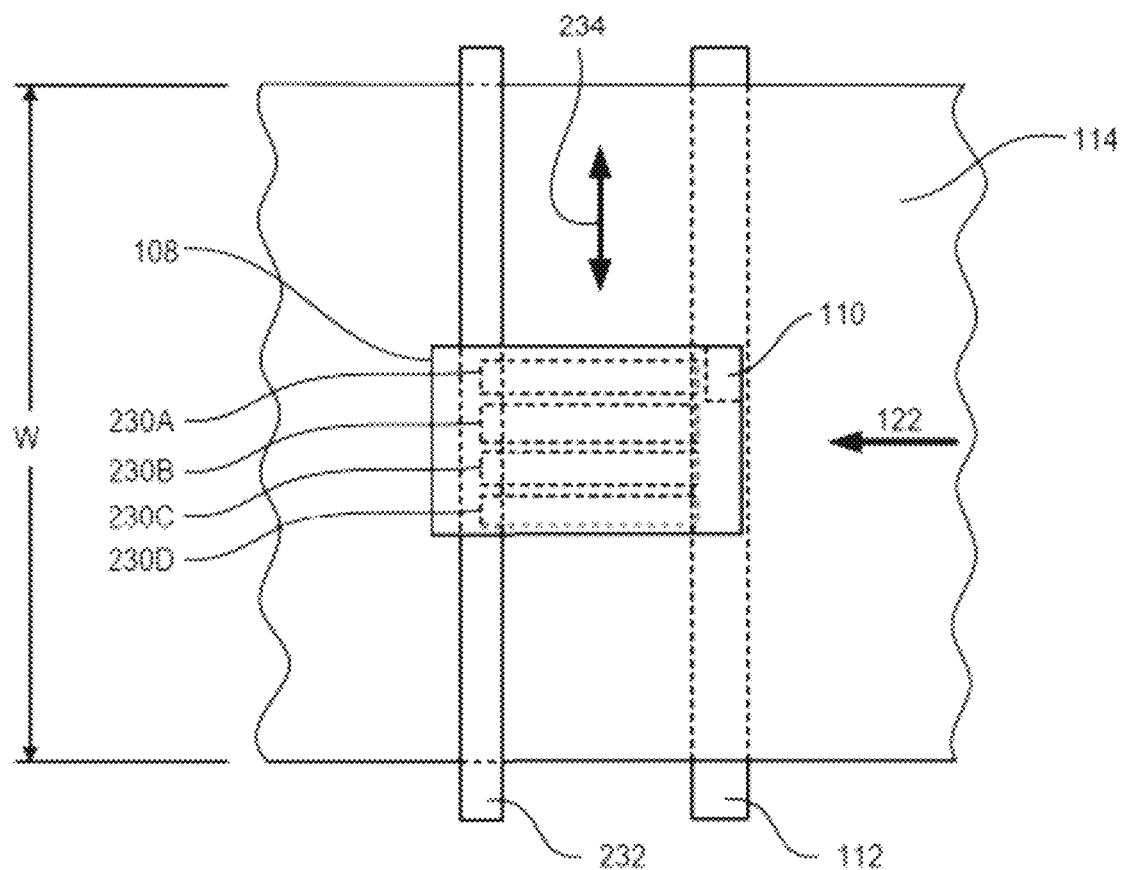
FIG. 2 is a schematic showing a sectional top view of the example printer as shown in FIG. 1.

FIG. 2 is a sectional top view of the example printer 100, showing some of the relevant components for illustration. In this example, print engine 108 is configured as a carriage mounted on guide rail 232. The carriage travels back and forth across the width W of the print medium 114 as shown by arrow 234. In some examples, the width of the print medium may be between about 60 and about 180 inches wide (i.e., about 1524 to about 4572 mm wide), for example about 130 inches (about 3,302 mm) wide. In other examples, the width of the media may be smaller or larger. The print engine 108 may also comprise motors, drive belts or gears, additional guide rails, linear position sensors, and the like, but these items are not shown for clarity.

Printheads (230A-230D) mounted in the carriage may deposit printing fluids onto the first side 118 (see FIG. 1) of print medium 114 as the carriage travels across the width of the print medium 114. In this example 4 printheads (230A-D) are shown mounted in the carriage. Printheads (230A-230D) are removably mounted in the print engine and may be user loadable/replaceable. Each printhead may deposit a distinct printing fluid—e.g., the printheads (230A-230D) may deposit black ink, cyan ink, yellow ink and magenta ink, respectively. In other examples, there may be more or fewer printheads mounted in the carriage. When printing an image, the print medium 114 is advanced in the printing direction 122 after each swath of the image is printed.

Sensor 110 is mounted in the carriage and sweeps back and forth across the print medium with the carriage. Light source 112 is positioned underneath the path the sensor makes as sensor travels back and forth across the medium. The print medium 114 travels between the sensor 110 and the light source 112, thereby allowing the light source to backlight the medium. In some examples, the sensor 110 may be used when the printheads are depositing printing fluids onto the print medium 114 and when the carriage is sweeping across the medium when the printheads are not depositing printing fluids onto the print medium 114. By sweeping the carriage across the full width of the print medium 114 and incrementally advancing the print medium 114 in the printing direction, the sensor may scan all areas of the print medium.

Figure 3:
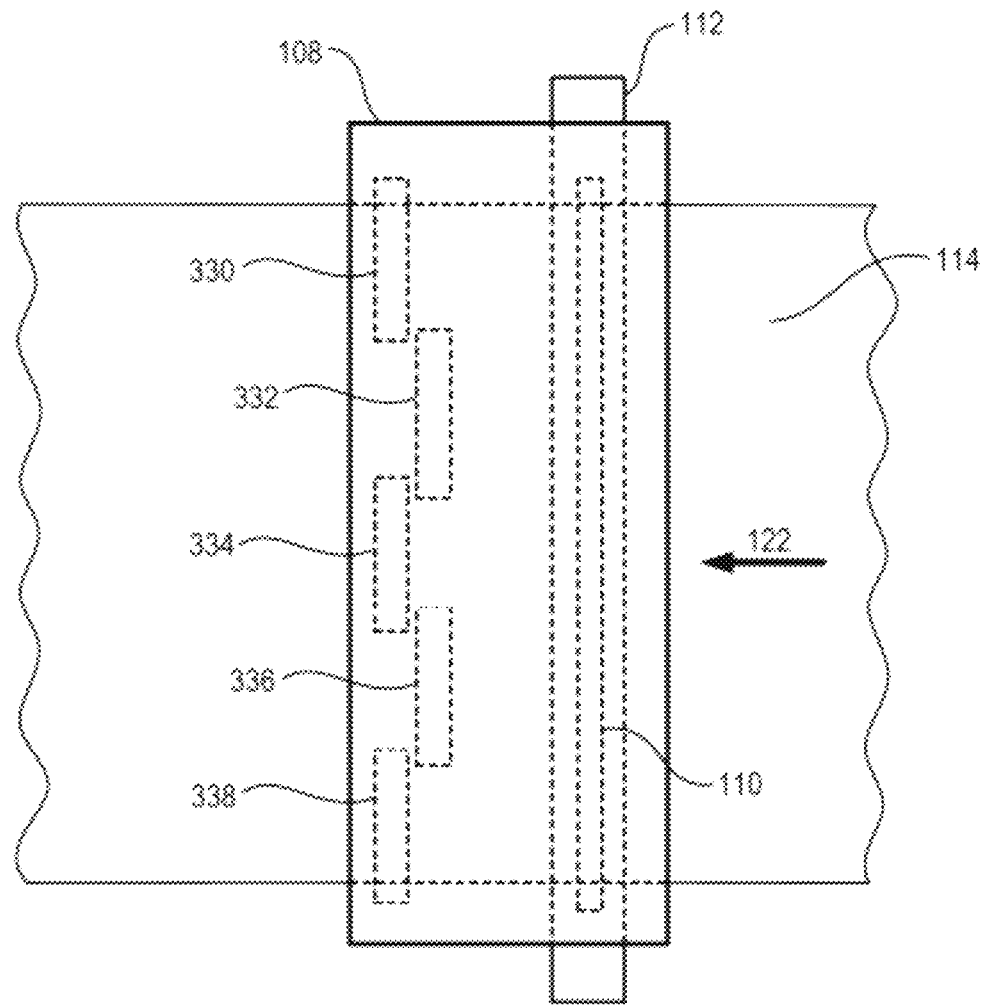
FIG. 3 is a schematic showing a sectional top view of another example printer described herein.

FIG. 3 is a sectional top view of another example printer. In this example print engine 108 is configured as a page wide array ("PWA") of printheads. The printheads (330-338) are arranged in a staggered line that stretches across the width of the print medium 114. In other examples, a single wide printhead may stretch across the full width of the print medium. During printing the print engine may remain stationary as the print medium moves underneath the print engine in the printing direction 122. In this example, there are 5 printheads that are mounted in the print engine and stretch across the width of the print medium. In other examples, there may be more or fewer printheads. Each printhead may deposit at least one type of printing fluid as the print medium moves underneath the print engine. For example, each printhead may deposit black ink, cyan ink, yellow ink, and magenta ink. In other examples, additional printing fluids may be deposited by each printhead.

In this example, sensor 110 is a line sensor, for example a line of CODs that stretch across the width of the print medium 114. As the print medium moves in the printing direction 12, the sensor may scan the full width of the print medium 114. Light source 112 is positioned underneath sensor 110. The print medium 114 may travel between the sensor 110 and the light source 112, thereby allowing the light source to backlight the print medium 114.

During one example operation, printer 100 prints an image and at least one fiducial mark on one side of the medium, and then the printer prints a mirrored copy of the image on the other side of the medium after the medium is flipped over. The side of the print medium that gets printed on first is herein referred to as "side A," The side that gets printed on second, after the print medium is flipped over, is herein referred to as "side B." In some examples, the print medium is in a continuous roll. The roll of medium is flipped over after the image is printed on side A once or multiple times, such that the image may be printed on side B after the printing of all the image(s) to be printed on side A is completed. In other examples, the print medium may start as sheets of media, or may be cut into sheets after printing on side A. After printing on side A, the sheets of print medium may be flipped over such that the image may be printed onto side B.

A fiducial mark may be employed to facilitate registration of the images on side A and side B. In one example, printer 100 prints an image and at least one fiducial mark onto side A of the print medium. The print medium is flipped over such that side B of the print medium is now facing the print engine. As the flipped print medium is advanced into the print zone the printer turns on the light source 112 backlighting the print medium. The sensor is employed to scan and locate any fiducial mark(s) on side A through the medium. A mirrored copy of the image printed on side A of the print medium is printed onto side B of the print medium that is now facing the print engine. The mirrored copy of the image printed on side B is aligned to the image printed on the side A, such that the images on side A and side B are registered. Fiducial marks are discussed further below. The registration may involve using the relative positions of the images on side A and side B to the location of the fiducial mark(s) printed on side A of the media. In one example, only one of these relative positions is involved, and in another example both are involved.

FIG. 4A is an example of the printing on side A. The printing on side A comprises an image 440 and fiducial marks 442 printed on both sides of the image 440. In this example the fiducial marks 442 are printed in a row down both sides of the image 440. In other examples, fewer fiducial marks may be used—e.g., only one fiducial mark 442 printed on one side of the image 440. In this example the fiducial marks are shaped like the letter 'N'. In other examples, other shapes may be used. The position of the fiducial marks relative to the position of the image is known. Therefore, when the location of a fiducial mark is determined, the location of the image is known.

Scanning the fiducial mark with a scan line creates peaks and valleys of light density. The peaks and valleys depend on where the scan line intersects the fiducial mark. FIG. 4B is an example fiducial mark being scanned. Fiducial mark 442 is shaped like the letter 'N'. Scan line 550 is shown passing through the middle of fiducial mark 442 without any skew. Line 552 is a plot of the optical intensity from scan line 550. The distance d1 is the distance between the two outer peaks. When the scan line passes through the fiducial mark with no skew distance d1 is equal to the actual width W of fiducial mark 442. Distance d2 is the distance between the middle peak and one of the outer peaks. In this example distance d2 is equal to ½ distance d1, indicating that scan line 550 is exactly between the top and bottom of fiducial mark 442.

FIG. 4C is an example fiducial mark being scanned. Scan line 550 is shown passing through the top of fiducial mark 442 without any skew. Line 552 is a plot of the optical intensity from scan line 550. The distance d1 is the distance between the two outer peaks. When the scan line passes through the fiducial mark with no skew distance d1 is equal to the actual width W of fiducial mark 442. Distance d2 is the distance between the middle peak and one of the outer peaks. In this example distance d2 is greater than ½ distance d1, indicating that scan line 550 is near the top of fiducial mark 442.

FIG. 4D is an example fiducial mark being scanned. Scan line 550 is shown passing through the top of fiducial mark 442 with some skew. Line 552 is a plot of the optical intensity from scan line 550. The distance d1 is the distance between the two outer peaks. When the scan line passes through the fiducial mark with skew, distance d1 is greater than the actual width W of fiducial mark 442. The difference between distance d1 and the actual width W may be used to determine the amount of skew.

In one example, the sensor scans with a resolution of 600 samples per inch. In other examples, the resolution may be higher or lower. When the print engine is configured as a carriage (as shown in FIG. 2), the sampling rate for the sensor may depend on the speed of the carriage. When the maximum carriage speed is 60 inches per second, the desired resolution of 600 samples per inch may result in a sampling rate for the sensor of 36 KHz. Other values are also possible. When the print engine is configured as a PWA, the line scanner may have a pixel spacing that matches the desired resolution.

Figure 5:
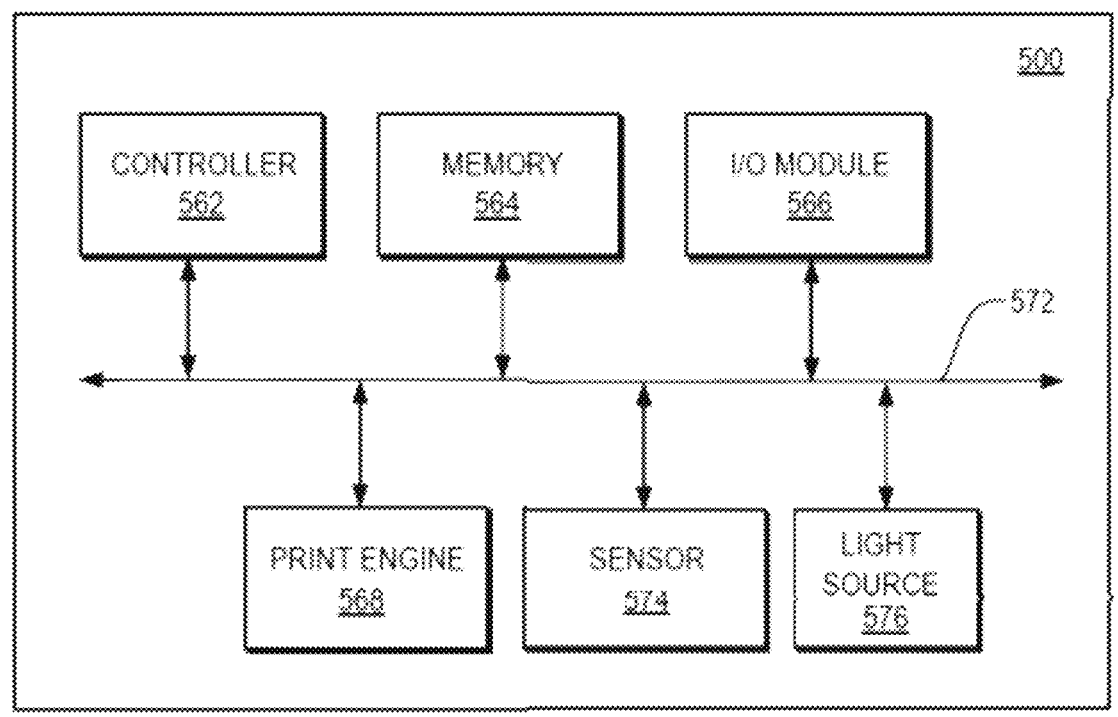
FIG. 5 is a schematic showing an electrical block diagram of an example printer 500 as described herein.

FIG. 5 is an electrical block diagram of an example printer 500. Printer comprises a controller 562, memory 564, input/output (I/O) module 566, print engine 568, sensor 574 and a light source 576 all coupled together on bus 572. In some examples printer may also have a user interface module, an input device, and the like, but these items are not shown for clarity.

Controller 562 may comprise at least one processor. The processor may comprise a central processing unit ("CPU"), a micro-processor, an application specific integrated circuit ("ASIC"), or a combination of these devices. Memory 564 may comprise volatile memory, non-volatile memory, and a storage device. Memory 564 may be a non-transitory computer readable medium. Examples of non-volatile memory include, but are not limited to, electrically erasable programmable read only memory ("EEPROM") and read only memory ("ROM"). Examples of volatile memory include, but are not limited to, static random access memory ("SRAM"), and dynamic random access memory ("DRAM"). Examples of storage devices include, but are not limited to, hard disk drives, compact disc drives, digital versatile disc drives, optical drives, and flash memory devices.

I/O module 566 may be employed to couple the printer to other devices, for example the Internet or a computer. Printer may have computer executable code (e.g., firmware) stored in the memory 564. The firmware is stored as machine readable instructions in the non-transitory computer readable medium (i.e., the memory 564). The term "machine" herein may refer to a processor, such as that of a computer. The processor may be a part of another apparatus, such as a printing apparatus. The processor may be any of those described herein. The processor may retrieve and execute the instructions stored in the non-transitory computer-readable medium to operate the printer and to execute functions. In one example, the processor executes code that registers and prints images onto a second side of medium. As described below, the process may also be used to establish baseline ICC profiles of the first and second sides of the print medium for future printing reference.

The term "machine-readable instruction" are employed herein in a generic sense to refer to any type of machine code or set of machine-executable instructions that may be employed to cause a machine (e.g., a computer or another type of processor) to implement the various examples described herein. The machine-readable instructions may include, but not limited to, a software or a program. The machine may refer to a computer or another type of processor. Additionally, when executed to perform the methods described herein, the machine-readable instructions need not reside on a single machine, but may be distributed in a modular fashion amongst a number of different machines to implement the various examples described herein.

Machine-executable instructions may be in many forms, such as program modules, executed by at least one machine (e.g., a computer or another type of processor). Generally, program modules include routines, programs, objects, components, data structures, etc. that perform particular tasks or implement particular abstract data types. Typically, the functionality of the program modules may be combined or distributed as desired in various examples.

Figure 6:
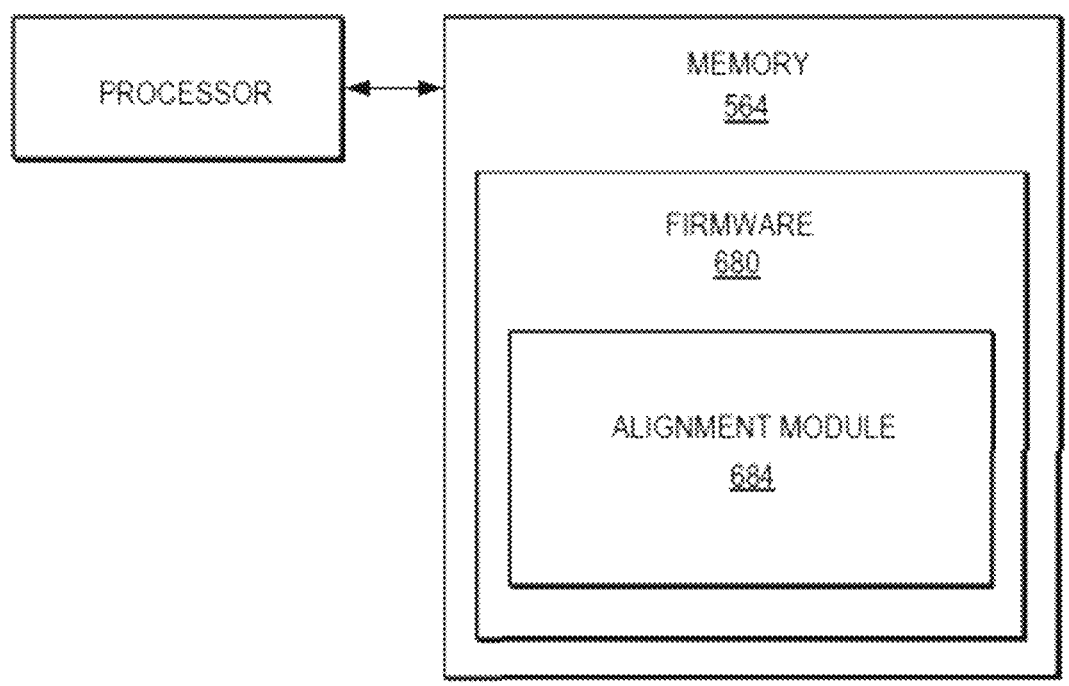
FIG. 6 is a schematic showing an example block diagram of the processor coupled to memory 564 as described herein.

FIG. 6 is an example block diagram of the processor coupled to memory 564. Memory 564 contains firmware 680. Firmware 680 contains an alignment module 684. The processor executes the code in the alignment module 684 to print an image on the second side of D&N media.

Fiducial Marks for Registration

FIG. 7 describes the processes involved in an example method of printing involving fiducial marks as described herein. As shown, the method comprises printing an image and fiducial marks on a first side of a print medium (S701). The print medium may be any of those described herein. In one example, the print medium comprises a translucent material. The fiducial marks comprise a set of first marks and a set of second marks. The first marks are ahead of the image. The term "ahead" denotes the relative position as a result of the printing direction—something is ahead is printed first, Two of the first marks are end marks at a first distance from respective opposite edges of the print medium, and each of the first marks has a first length and is located at a second distance from a beginning edge of the image. The second marks are along a length (along the Y axis) of the print medium. Each of the second marks is at the first distance from the respective opposite edges, has a second length smaller than the first length, and is at a third distance from another second mark.

Figure 8:
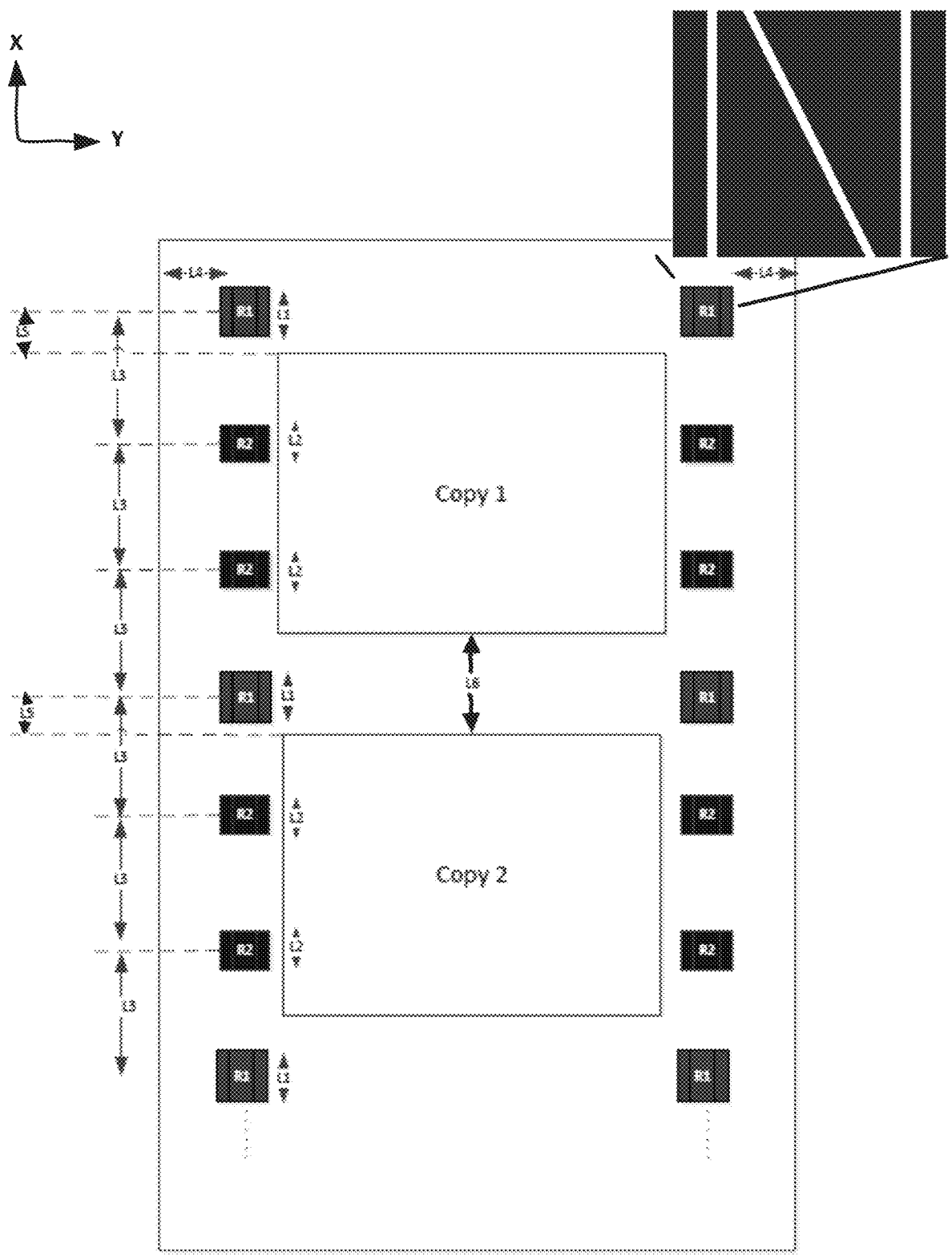
FIG. 8 is a schematic showing an example layout of fiducial marks as described herein.

The first and second fiducial marks referenced in FIG. 7 are described in further detail using FIG. 8. The fiducial marks may have any suitable geometry, shape, and/or color, depending on the applications. The first and second marks may be the same as or different from each other. For example, a fiducial mark may be a black rectangle with multiple (vertical or horizontal) lines of a different color. In one example, a fiducial mark herein may be a black rectangle with a white "N" shape therein, as shown in the zoom-in image on the top right corner of FIG. 8. In one example, the first marks and the second marks have the same pattern but different sizes.

FIG. 8 is a schematic showing the layout of sets of the first and second fiducial marks on a print medium in one example. It is noted that FIG. 8 shows the printing of two copies of an image and their respective sets of fiducial marks only for illustration purpose. The printing need not involve printing more than one copy of the image.

Only for the sake of discussion, the longer side of the print medium (or Y direction) is considered the "length" of the medium, while the shorter side of the print medium (or X direction) is considered the width thereof; see FIG. 8 for the coordinates. In FIG. 8, R1 represents a first fiducial mark, which is printed ahead of the image and is used to delineate the beginning of the image. As shown in the figure, the R1s at the left and right at the top of the print medium may be considered the end marks. The number of first fiducial marks may vary. In one example, there may be two first marks, such as the case as shown in FIG. 8. In another example, there are more than two first marks, such as the case shown in FIGS. 9 and 10.

R2 represents the second fiducial mark placed along the length of the image. L1 refers to the length of each first mark (i.e., R1), which is larger than the length of each second mark L2. In other words, L1 corresponds to the first length as mentioned in FIGS. 7 and L2 to the second length. The difference between L1 and L2 may be of any suitable value. For example, L1 may be larger than L2 by at least about 3 mm e.g., at least about 5 mm, about 8 mm, about 10 mm, about 15 mm, about 20 mm, or larger. Other smaller or larger values may also be possible.

L3 represents the distance (along the Y direction) between centers of the fiducial marks. L3 corresponds to the "third distance" referenced in FIG. 7 and represents the distance between two second marks, as well as the distance between a first mark and a (adjacent) second mark, as shown in FIG. 8. In one example, L3 is constant for the entire print queue, and the value thereof may depend on the pass advance of the print mode selected for side B printing. As a result, in one example, the registration error may be determined while the print carriage is printing the pass. L4 represents the distance from an edge of the print medium to left and right end marks on both side A and side B. L4 corresponds to the "first distance" referenced in FIG. 7. In one example, printing the fiducial marks at a predetermined constant distance from the edges allows positioning of the print carriage at the location where the appropriate fiducial marks are to be detected. The position may be automatic, the term herein referring to being carried out involving an algorithm.

L5 represents the distance (along the Y direction) between the center of the first mark R1 and the beginning (edge) of the image to be printed, as shown in FIG. 8. L5 corresponds to the "second distance" referenced in FIG. 7. L6 represents the distance (along the Y direction) between copies of the images. It is noted that the ability of control L6 may be valuable in the case of multi-copy printing. In one example, L6 is automatically adjusted so as to keep both L5 and L3 constant along all the rows of copies in the printing queue.

The method as shown in FIG. 7 may additionally comprise scanning, using a sensor, the fiducial marks while the fiducial marks are backlit by a light source (S702). The sensor may be any of those described herein. In one example, the scanning may be accomplished through the print medium using the sensor position in proximity to the second side (side B) of the print medium. The scanning may be carried out while a light source, such as any of those described herein, positioned in proximity to the first side (side A) backlights the fiducial mark(s).

As shown in FIG. 7, the method may also comprise printing a registered mirrored copy of the image on the second side of the print medium using respective relative positions of at least some of the scanned fiducial marks to the image (S703). In one example, all of the scanned fiducial marks are used.

It is noted that any of the printing processes described herein may be accomplished by any suitable printer, such as one suitable for D&S printing, including those described herein (e.g., those as shown in FIGS. 1 and 5). For example, the printer may be a roll-to-roll printer. An example of a suitable printer is an HP Latex printer commercially available from HP Inc., USA. In one example, the printing process may involve a raster image processor ("RIP").

The RIP may be a part of the print engine as described herein. The RIP may also locate elsewhere in the printer. In one example, an RIP is a component used in a printing system which produces a raster image also known as a bitmap. Such a bitmap is used by a later stage of the printing system to produce the printed output. The input may be a page description in a high-level page description language such as PostScript, Portable Document Format, XPS, or another bitmap of higher or lower resolution than the output device. In the latter case, the RIP applies either smoothing or interpolation algorithms to the input bitmap to generate the output bitmap. An RIP may be implemented either as a software component of an operating system or as a firmware program executed on a microprocessor inside a printer, though for high-end typesetting, standalone hardware RIPs are sometimes used. Ghostscript and GhostPCL are examples of software RIPs. A PostScript printer may contain an RIP in its firmware.

The use of the first and/or second fiducial marks may facilitate the registration of the images on side A and side B during printing. For example, the printing method may comprise detecting an amount of misalignment using the respective relative positions of at least some (or, in some instances, all) of the scanned fiducial marks to the image. The apparatus may then adjust the print medium and/or a print engine to correct for the amount of misalignment. Taking into account the adjustment, the apparatus may then print the registered mirrored copy of the image.

As noted above, the method may be employed to print multiple copies of the image on the side A before printing registered copies of these multiple copies of images on side B. In such an example, the method may comprise repeating the processes as described in FIG. 7 but in different locations of the print medium. For example, the method may further comprise printing a second image and replicas of the fiducial marks at a different location on the first side of the print medium. The method may comprise scanning, using the sensor, the fiducial marks replicas. Additionally, the method may comprise printing a registered mirrored copy of the second image on the second side of the print medium using respective relative positions of at least some of the scanned fiducial marks replicas to the image.

The fiducial marks as described herein may be scanned and recognized by the apparatus and algorithms as described herein. The pattern as described herein—e.g., black rectangle and the white N letter pattern for the fiducial mark may facilitate recognition. Also, the first fiducial marks are distinct from the second fiducial marks, at least with respect to the length thereof. The difference in length may allow the light sensor embedded in the print carriage, which sensor may also be employed for scanning and reading the fiducial marks, to be employed also for automatic identification of the location of the beginning of the image. Thus, by strategically placing the first fiducial marks relative to the second fiducial marks, the relative location of the image, as well as misalignment, may be determined.

In one example, the determination may be accomplished by moving the printing carriage horizontally (along the X axis) so as to leave the sensor at the scan axis position, where the lateral fiducial marks are detected when the marks pass below the sensor. Subsequently, by moving the print medium forwards and having the sensor scanning the fiducial marks, the transition from the white to black and then white at the fiducial mark may be detected. Once black is detected, the apparatus may check whether a scanned fiducial is the first fiducial mark. The checking may be accomplished by first moving a little bit backwards the print medium and then moving forward for a distance sufficient to allow scanning of the whole fiducial mark length. Subsequently, the distance from the edge of the print medium to the transition white to black to the transition black to white is determined. When the distance corresponds to the nominal length of a first fiducial mark as described herein, the algorithm and the apparatus may deem that a first fiducial mark is located. Accordingly, the print medium is scanned from left to right to detect whether it is at the correct Y coordinate to start printing.

In one example, the N-shaped lines in the fiducial marks may generate a triplet of peaks for each fiducial scanned. The distance between the peaks may allow determination of the Y axis offset from the center of the fiducial marks. The scanning and interpreting of the fiducial marks may be as described in FIGS. 4B-4D. Comparing the distance measured to a designated threshold (e.g., the nominal size of first mark within a margin of error), the first fiducial marks and the second fiducial marks may be distinguished. As a result, this technique may allow using the fiducial marks to identify the beginning of an image to be printed. Additionally, the average of the offsets detected on the left and the right fiducial marks may be used to move the print medium so as to leave it in the correct Y coordinate to start printing with registration. Accordingly, side B starts in register with side A regardless of the ability of the user to manually place the fiducial marks in a specific location. In this example, by counting the number of "black readings" and knowing the speed at which the print medium moves and the sampling frequency, the relative coordinate on the Y axis of the detected mark with respect to the image may be determined.

Additionally, the fiducial marks described herein may enable resuming of side B printing after an interruption during a print job. As an illustrative example: a print job involves printing 10 copies of the same image. While printing the first copy the user detects an issue (e.g., a technical challenge related to a printhead) and thus interrupts the print job. When the user is ready to resume printing, starting from copy #2 (copy #1 is spoiled because the job has been interrupted), the user sets the job to print again and the first fiducial marks are automatically detected using carriage light sensor. To enable starting the workflow from any copy, the distance along the Y axis between the first fiducial marks and the beginning (edge) of the image are kept constant for all of the copies in the print job. In one example, to control registration while printing side B, the fiducial marks are laid out with a given spatial frequency along the Y axis (corresponding to the distance advanced for each printing pass or a multiple of it). Thus, in one example this results in that when a multi-copy double-sided D&N print job is carried out, the user is not allowed to specify the spacing along the Y axis between the copies. Instead, the algorithm, through the fiducial marks described herein, may lay out the rows of copies automatically so that all copies start at the same distance along the Y axis from their respective first fiducial marks.

One benefit of the methods described herein is that the side B copies of the print job need not be printed all at once, and in case of an issue in a copy printing may be resumed while registration is maintained. In one example, the methods described herein may allow the user to print only the first side B copy and the check registration before commencing the whole production of the roll. It is noted that if the copies were just laid out one after another without adjusting their spacing along the Y axis to make each copy start at the same distance along the Y axis from its first fiducial marks, whenever there is an issue in the middle of the side B printing, the user would have to move back the print medium to the beginning of the print queue and start from the beginning again. This may be inconvenient and often may be difficult in practice because the first copies are already printed on both sides, and printing on them again may spoil the printing.

The methods related to the fiducial marks descried herein may involve the Internal Print Server used in a printer (e.g., HP Latex printers) as front end of the print engine. In one example, the algorithm receives rastered images from an RIP algorithm and processes them before sending them to the print engine. For double-sided D&N print job, the user may select the print mode to be used for printing side A and side B independently. Once a double-sided D&N print queue is sent to the print engine, the algorithm may automatically add the fiducial marks at a predetermined distance from the lateral edges (along the Y axis) of the loaded roll.

After all copies and jobs are printed on side A, the roll may be rewound and then reversed and loaded again in the printer to start printing side B. The user may then select to print side B and send to print the queue of jobs. At this point, the methods and apparatus described herein may be employed. For example, the backlit installed just before the print zone of the printer may backlight the print medium so that the fiducial marks on side A may be scanned by a sensor from side B. The print carriage where the light sensor is located may move to the scan axis location where the fiducial marks are printed, and then the print medium may be moved forward at a constant speed until the light sensor detects a transition from white (high light level detected) to black (low light level detected), as described above. Once black is detected, it may be checked whether is the first fiducial marks, following the processes described above.

The methods and apparatus described herein may also allow locating the beginning of the next row of copies by searching automatically for the next fiducial mark of a specific length. This may take human error out of the workflow because even when the user mistakenly places the beginning of the image by moving the print medium manually, the printer will detect it is wrongly placed and may search for the correct beginning. As a result, it at least one example the method described herein may reduce, or even prevent, waste due to wrongly printing side B copies in the wrong place.

The layout of the fiducial marks need not be limited to that shown in FIG. 8. Any other suitable layout is also possible. For example, in one example the set of first marks comprises an array of first marks along a width of the print medium, the end marks being at two ends of the array. In this example, at least some of the first marks are separated from each other by a specific distance. In this example, the method involves a light sensor installed in a print carriage, a light source placed below the printed medium. A row of fiducial marks are printed at the beginning of each copy when printing the first side of the print medium. This row of fiducial marks are then scanned and read by the light sensor in the carriage before and while printing along with the printing passes. The measurements of the displacements in X and Y directions at the marks are used by an algorithm to adjust the next bands to be printed before sending them to the print engine. This adjustment of the bands can reduce, sometimes even prevent, registration error between the images of side A and side B.

FIG. 9 describes the processes involved in another example method of printing involving fiducial marks as described herein. As shown, the method may comprise printing an image and fiducial marks on a first side of a print medium (S901). The fiducial marks comprise a set of first marks and a set of second marks. The first fiducial marks are ahead of the image. Each of the first marks has a first length and is located at a second distance from a beginning edge of the image. Two of the first marks are end marks at a first distance from respective opposite edges of the print medium. The remaining first marks of the set are arranged as an array along a width of the print medium. The first marks in the array are separated from each other, as well as the first of the array separated from one of the end marks, by a fourth distance. The fourth distance is described further below with respect to FIG. 10.

The second fiducial marks may be placed along a length (Y axis) of the print medium. Each of the second fiducial marks is at the first distance from the respective opposite (lateral) edges. Each second mark may have a second length smaller than the first length. Each second mark is at a third distance from another second mark. The terms first, second, and third distances are as described above.

Figure 10:
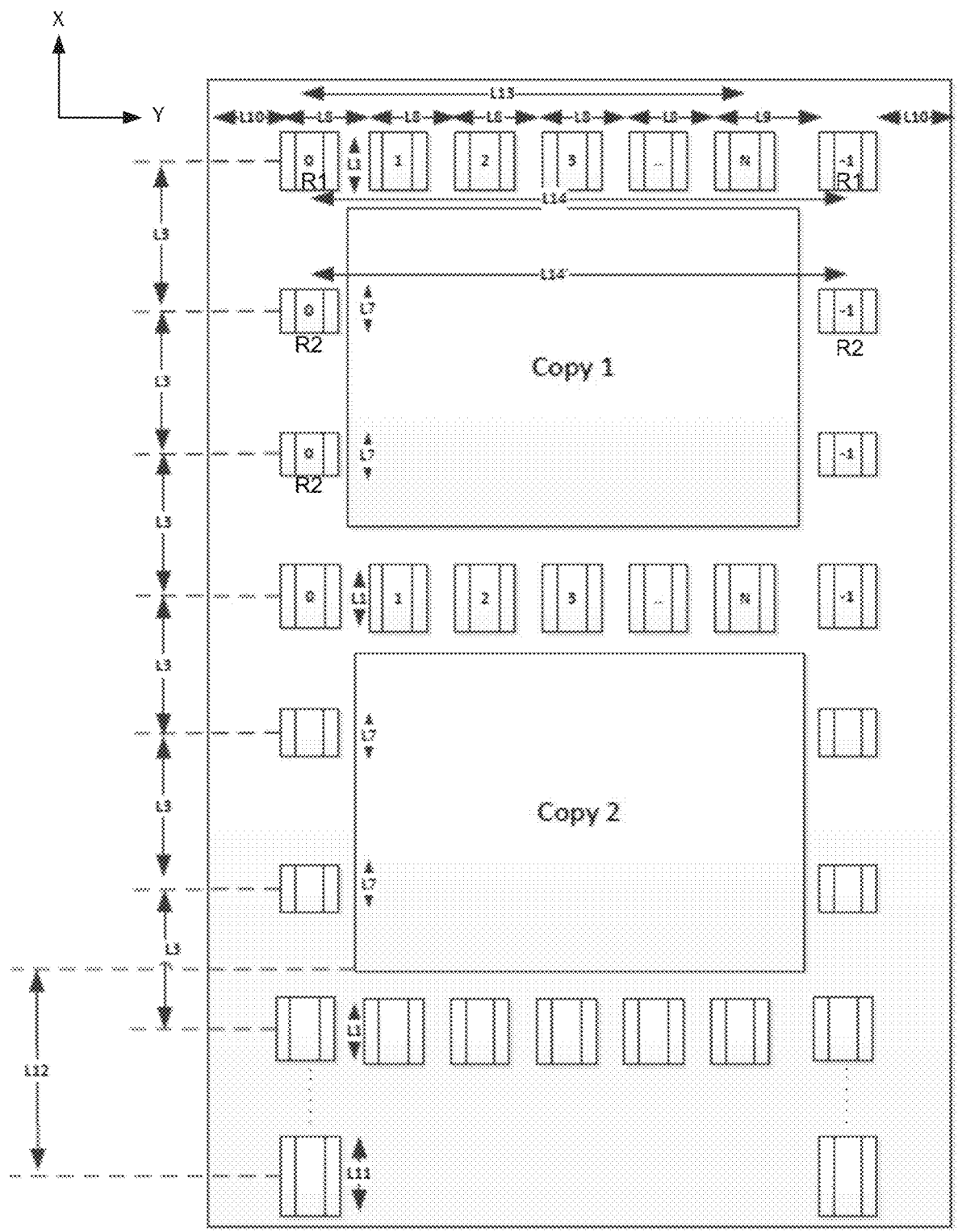
FIG. 10 is a schematic showing another example layout of fiducial marks as described herein.

FIG. 10 is a schematic showing the layout of sets of the first and second fiducial marks on a print medium in one example. It is noted that FIG. 10 shows the printing of two copies of an image and their respective fiducial marks only for illustration purpose. The printing need not involve printing one copy of the image.

In FIG. 10, R1 represents a first mark, which is printed ahead of the image and is used to delineate the beginning of the image. As shown in the figure, the R1 and R2 represents the first and second fiducial marks, respectively, as in the case of FIG. 8. L1 refers to the length of each first mark (i.e., R1), which is larger than the length of each second mark L7. In other words, L1 corresponds to the first length as mentioned in FIGS. 9 and L7 to the second length. L7 also corresponds to L2 of FIG. 8. The difference between L1 and L7 may have any suitable value. For example, L1 may be larger than L7 by at least about 3 mm—e.g., at least about 5 mm, about 8 mm, about 10 mm, about 15 mm, about 20 mm, or larger. Other smaller or larger values may also be possible.

L3 in FIG. 10 corresponds to L3 in FIG. 8, representing the distance (along the Y axis) between centers of the fiducial marks. L3 corresponds to the "third distance" referenced in FIG. 8. L3 represents the distance between two second marks, as well as the distance between a first mark and a second mark, as shown in FIG. 10. In one example, L3 is constant for the entire print queue, and the value thereof may depend on the pass advance of the print mode selected for side B printing. As a result, in one example the registration error may be read while the print carriage is printing the pass.

L8 in FIG. 10 represents the distance along the X axis (width direction) between the first fiducials. L8 corresponds to the "fourth distance" as referenced in FIG. 9. L8 may be of any suitable value. For example, L8 may be about 1 inch (2.54 cm). Other larger or smaller values are also possible. L9 represents the distance along the X axis between the last fiducial of the array of first marks (as described in FIG. 9) and the right end mark. In one example, L8 and L9 are related to by the relationship: $L8 \leq L9 < 2 \times L8$.

L10 corresponds to L4 of FIG. 8, representing the distance from a (lateral) edge of the print medium to left and right end marks on both side A and side B. L10 corresponds to the "first distance" referenced in FIG. 9. L11 represents the length of each of last row of fiducials in a print run—only one is shown in the figure for clarity. These fiducials of the last row are not considered as part of the first or second fiducials, although they may have the same geometry, size, and/or pattern as the first and second fiducials. The geometry, size, and/or pattern of the last row fiducials may be different from the first and second fiducials. For example, L11 may be larger than L1. For example, L1 may be larger than L7 by at least about 3 mm—e.g., at least about 5 mm, about 8 mm, about 10 mm, about 15 mm, about 20 mm, or larger. Other smaller or larger values may also be possible. L12 represents the minimum distance along the Y axis between the end of the image and the mid-point of the last row of fiducials.

L13 represents the distance along the X axis between the center of the first fiducial and the center of the last fiducial in the array as mentioned in FIG. 9—the last fiducial of the array is placed at a multiple of L8 as measured from the data from the scanned fiducials. The nominal distance between the first and last of these fiducials is known (i.e., $N \times L8$, wherein N is the number of first fiducials in the array). Using these data, an Initial Scaling Factor for side B is determined by: $L13/(N \times L8)$.

L14 represents the distance along the X axis from the first to the last fiducial in the top row—i.e., the distance between the two end marks (the data of which may be stored by a firmware, L14' represents the distance along the X axis for a pair of fiducials. Using these data, a Scaling Factor may be calculated using the relationship: Scale Factor=$(L13/(N \times L8))'(L14/L14')$. In one example wherein the Nth fiducial may not be read, the Scale Factor is computed using fiducial (N-1)th, and so forth. In one example wherein no fiducial from 1 to N may be read, the Scale Factor is set to 1× in this case in some instances an error is raised and the print job is interrupt particularly if at the beginning of a print run. If not at the beginning of the print run, the print job may continue and the last $(L13/(N \times L8))$ value may be used to compute the Scale Factor until a new value is determined.

Similar to the method described in FIG. 7, the method shown in FIG. 9 may also comprise scanning, using a sensor, the fiducial marks while the fiducial marks are backlit by a light source (S902). The method may also comprise printing a registered mirrored copy of the image on the second side of the print medium using respective relative positions of at least some of the scanned fiducial marks to the image (S903). The apparatuses and components thereof mentioned in FIG. 9 may be any of those described herein.

The use of the first and/or second fiducial marks may facilitate the registration of the images on side A and side B during the printing process. For example, the printing method may comprise detecting an amount of misalignment using the respective relative positions of at least some of the scanned fiducial marks to the image. The apparatus may then adjust at least one of the print medium and a print engine to correct for the amount of misalignment. Using the adjustment, the apparatus may print the registered mirrored copy of the image on side B.

The method as shown in FIG. 9 may facilitate registration in double-side D&N printing on a print medium having a relative large width. The width may be any of those described herein. For example, the width may be at least about 150 cm (about 60 inches)—at least about 160 cm, about 180 cm, about 200 cm, about 250 cm, about 300 cm, about 350 cm, about 400 cm, or larger. Other larger or smaller values are also possible. The level of registration between the images on side A and side B as a result of the methods described herein, including that shown in FIGS. 7 and 9, may be desirably low. For example, the mis-registration may be smaller than about 5 mm smaller than about 4 mm, about 3 mm, about 2 mm, about 1 mm, about 0.5 mm, about 0.25 mm, about 0.20 mm, about 0.15 mm, about 0.10 mm, or smaller. As described further below, the mis-registration may encompass scale, tilt, and/or bow.

The methods and apparatuses described herein may be employed for automatic measurement of the deformation of the print medium by reading a row of printed fiducial marks with a light sensor. An image on the first side may then be adjusted accordingly so that the image prints in register with the one printed on the first side of the medium.

Deformation of the print medium is often an issue, particularly in the case of printing on wide print media. For example, for wide rolls (e.g., 126 inches or larger), it may not be enough to align both sides along the X and Y axes. The deformation may happen when the first side of the roll (of the print medium) is printed by a Latex printer as a result of the ink being cured at a relatively high temperature ($\geq 80°$ C.) to be bound to the medium. Additionally, the print medium may be subject to tension from the output winding system and the input feeding system. In some instances, the simultaneous application of heat, tension, and ink to the print medium may give rise to deformations of the print medium with respect of its initial shape. At least three types of the deformations observed are scaling (medium either shrinks or expands after being printed), tilt (left and right side of the medium are not well aligned), and bow (the central part of the medium is bowed with respect to the edges). The incidence and impact of these deformations may be significant. For example, while bow effects may be low in rolls of up to 60" wide, the effects may be at least 5 mm on a 126" PVC banner roll. Tilt may also be more relevant as width increases and be slowly varying as the roll advances. Moreover, shrinkage and expansion may be relevant for paper-based media and the effect may be of up to 1 cm for a 126" wide roll. One adverse result of these deformations is a visible lack of registration between the images printed on side A and side B of the print medium.

The methods and apparatus described herein may help overcome these challenges. For example, the strategically placed fiducial marks described herein may allow determination of amounts of different types of deformations. Also, in at least one example these fiducial marks are black rectangles with 2 vertical lines around a diagonal line (an N-shape registration mark). Thus, when scanned by a light sensor (e.g., located in the print carriage) these marks produce a signal consisting in 3 peaks of light for each registration mark. By measuring the distance between the peaks of a fiducial mark, it may then be possible to measure where the mark is scanned (at its center, above it or below it).

In one example, an array of N evenly spaced first fiducial marks are printed so that we have N deformation measurement points. These first marks allow measurement of displacements of each mark in both X and Y directions with respect to the nominal position where the mark is first printed on side A. In this example, because the marks are printed at a known distance from each other, it may be possible to measure the expansion or shrinking factor by comparing the distance from the first to the last mark with respect to where they should be nominally. This design may be akin to embedding a ruler in the print with a known original length. If the width of the print changes, the ruler may change accordingly. The methods described herein may circumvent the need to store the original width of the print.

In one example, the methods and apparatuses described herein allow measurement of the bow effect and other kinds of deformation that happen across the width of a print medium. Because the fiducial marks are printed at the beginning of each row of copies of the print job, the marks allow dynamically applying the specific corrections for each copy. This flexibility may be valuable because the effects of bow and tilt may vary significantly along the printing of a roll (e.g., length 50 m). Measuring bow at the beginning of each copy may allow correcting effectively the copy as far as it is not long enough for the bow to change significantly from the beginning to its end—for many media this may be enough for copies of up to 6 m long. However, other larger or smaller lengths are also possible.

In one example, the rows of fiducial marks are dynamically scanned and measured on-line during printing, and the measurements are employed for the algorithm and/or apparatuses to adjust the subsequent bands of image to be printed. This happens at least because the sensor reading the marks is located in the print carriage so that the marks printed in side A are scanned some passes before the corresponding content in side B is printed. The time provided as a result of this process may allow the algorithm to adjust the image bands before sending them to the print engine.

The measurements of the first fiducial marks are decomposed in two components: a linear tilt and the bow. The bow related measurements are stored and applied along the entire print job, while the tilt related measurements are measured at each pass with the lateral fiducial marks. Thereafter, the bow measured is applied at the beginning of the print copy on top of the tilt, which is measured along the copy. As a result, the implementation of the methods described herein may facilitate registration of the images. It was found that using the methods described herein resulted in a registration error as described above. In one example, the error was less than or equal to 2 mm at any point between the side A and side B images. By contrast, a comparative process without using the methods described herein resulted in a registration error of 6 mm at the center of the substrate—this level of error is generally considered unacceptable.

Various examples described herein may be embodied at least in part as a non-transitory machine-readable storage medium (or multiple machine-readable storage media)— e.g., a computer memory, a floppy disc, compact disc, optical disc, magnetic tape, flash memory, circuit configuration in Field Programmable Gate Arrays or another semiconductor device, or another tangible computer storage medium or non-transitory medium) encoded with at least one machine-readable instructions that, when executed on at least one machine (e.g., a computer or another type of processor), cause at least one machine to perform methods that implement the various examples of the technology discussed herein. The computer readable medium or media may be transportable, such that the program or programs stored thereon may be loaded onto at least one computer or other processor to implement the various examples described herein.

For example, provided herein is a non-transitory machine-readable medium stored thereon instructions, which when executed, cause at least one machine to perform any of the processes described herein. In one example, the method comprise printing an image and fiducial marks on a first side of a print medium. The fiducial marks may be any of these described herein. For example, the marks may comprise a set of first marks ahead of the image and a set of second marks along a length of the print medium. Two of the first marks are end marks at a first distance from respective opposite edges of the print medium, and each of the first marks has a first length and is located at a second distance from a beginning edge of the image. Each of the second marks is at the first distance from the respective opposite edges, has a second length smaller than the first length, and is at a third distance from another second mark. The method may also comprise scanning, using a sensor, the fiducial marks while the fiducial marks are backlit by a light source. Additionally, the method may comprise printing a registered mirrored copy of the image on the second side of the print medium using respective relative positions of at least some of the scanned fiducial marks to the image.

One example herein also provides a printer, such as any of those described herein, that contains a non-transitory machine-readable medium stored thereon machine-readable instructions to carry out the methods as described herein.

Due at least in part to the aforedescribed features, the apparatuses and methods described herein may have several beneficial properties. For example, because the beginning of the image to be printed is marked by distinct fiducial marks (i.e., first marks in the examples as described herein), additional marks are not be needed to be printed at a different position along the Y axis of the print medium, thereby reducing waste of lateral medium space along the whole roll. In another example, the use of the fiducial marks herein allows the marks that are originally intended to be used for Y axis registration detection to be used also for detection of the next copy of the image at a different location on the same side of the print medium as the first image.

In one example, the apparatuses and methods described herein may make the double-sided D&N print workflow robust by detecting automatically the begin of copy and reducing, in some instances even eliminating, potential user errors that may misplace the begin of copy and spoil the whole print production. As another benefit, a queue printing at the following copy may be easily resumed. In some examples, this is beneficial because with the wrong layout printing may only start from the beginning of the queue to get good registration—this may be inconvenient and time consuming, making the workflow quite unusable in practice. Also, the apparatuses and methods described herein may extend usage of fiducial to delineate beginning of a row of copies, thereby increasing efficiency because this may save media and ink that would otherwise be wasted for printing additional marks.

In another example, the use of the fiducial marks, particularly those with the first marks in the form of an array, may make it possible to have registration errors below 1 mm for images printed in wide rolls that would otherwise exhibit registration errors of up to 1 cm. In particular, the apparatuses and methods described herein may reduce the issue with respect to bowing of the print medium. For example, the measurement of bow happens on-line while printing and right before the actual print so that the measurement is based on the stat of the substrate right before printing. The measurement of bow is performed for each row of copies so that this mechanism ensures good registration even if the bow varies along the length of the roll. The measurement and correction of bow does not impact the printing speed, because the bow is measured in parallel with the printing of a swath and the distortion of the image bands does also happen in parallel while printing.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure, including the claims, are used to describe and account for small fluctuations, such as due to variations in processing. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed:

1. A method, comprising:
   printing an image and fiducial marks on a first side of a print medium, wherein the fiducial marks comprise:
      a set of first marks ahead of the image, wherein two of the first marks are end marks at a first distance from respective opposite edges of the print medium, and each of the first marks has a first length and is located at a second distance from a beginning edge of the image; and
      a set of second marks along a length of the print medium, wherein each of the second marks is at the first distance from the respective opposite edges, has a second length smaller than the first length, and is at a third distance from another second mark;
   scanning, using a sensor, the fiducial marks while the fiducial marks are backlit by a light source; and
   printing a registered mirrored copy of the image on the second side of the print medium using respective relative positions of at least some of the scanned fiducial marks to the image.

2. The method of claim 1, wherein the set of first marks has two first marks, and wherein the first length is larger than the second length by at least about 5 mm.

3. The method of claim 1, wherein
   the set of first marks comprises an array of first marks along a width of the print medium, the end marks being at two ends of the array; and
   at least some of the first marks are separated from each other by a fourth distance.

4. The method of claim 1, wherein printing the registered mirrored copy of the image further comprises:
   detecting an amount of misalignment using the respective relative positions of at least some of the scanned fiducial marks to the image;
   adjusting at least one of the print medium and a print engine to correct for the amount of misalignment; and
   printing the registered mirrored copy of the image using the adjustment.

5. The method of claim 1, further comprising:
   printing a second image and replicas of the fiducial marks at a different location on the first side of the print medium;
   scanning, using the sensor, the fiducial marks replicas; and
   printing a registered mirrored copy of the second image on the second side of the print medium using respective relative positions of at least some of the scanned fiducial marks replicas to the image.

6. The method of claim 1, wherein each of the fiducial marks is a black rectangle with a white "N" shape therein.

7. The method of claim 1, wherein the print medium comprises a translucent material.

8. A method, comprising:
   printing an image and fiducial marks on a first side of a print medium, wherein the fiducial marks comprise:
      a set of first marks ahead of the image, wherein each of the first marks has a first length and is located at a second distance from a beginning edge of the image, wherein two of the first marks are end marks at a first distance from respective opposite edges of the print medium, wherein the remaining first marks of the set are arranged as an array along a width of the print medium, and wherein the first marks in the array are separated from each other, as well as the first of the array separated from one of the end marks, by a fourth distance; and
      a set of second marks along a length of the print medium, wherein each of the second marks is at the first distance from the respective opposite edges, has a second length smaller than the first length, and is at a third distance from another second mark;
   scanning, using a sensor, the fiducial marks while the fiducial marks are backlit by a light source; and
   printing a registered mirrored copy of the image on the second side of the print medium using respective relative positions of at least some of the scanned fiducial marks to the image.

9. The method of claim 8, wherein printing the registered mirrored copy of the image further comprises: detecting an amount of misalignment using the respective relative positions of at least some of the scanned fiducial marks to the image; adjusting at least one of the print medium and a print engine to correct for the amount of misalignment; and printing the registered mirrored copy of the image using the adjustment.

10. The method of claim 8, further comprising:
calculating a scale factor, which is presented by $$\text{scale factor} = (L13/(N \times L8)) \times (L14/L14'),$$

wherein L13 represents a distance between the first and last first marks of the array of first marks as measured from data of the scanned fiducial marks, N a number of the first marks in the array, L8 the fourth distance, L14 a distance between the two end marks, and L14' a distance between two of the second fiducials that are at opposite edges of the print medium and both at the third distance from the respective first marks; and
adjusting the printing of the registered mirrored copy using the scale factor.

11. The method of claim 8, wherein the sensor is mounted on a carriage in a print engine that sweeps back and forth across the width of the print medium.

12. The method of claim 8, wherein the width of the print medium is at least 150 cm.

13. The method of claim 8, wherein an amount of misregistration between the image and the mirrored copy thereof is smaller than about 2 mm.

14. A non-transitory machine-readable medium stored thereon machine executable instructions, which when executed by a machine, performs a method comprising:
printing an image and fiducial marks on a first side of a print medium, wherein the fiducial marks comprise:
a set of first marks ahead of the image, wherein two of the first marks are end marks at a first distance from respective opposite edges of the print medium, and each of the first marks has a first length and is located at a second distance from a beginning edge of the image; and
a set of second marks along a length of the print medium, wherein each of the second marks is at the first distance from the respective opposite edges, has a second length smaller than the first length, and is at a third distance from another second mark;
scanning, using a sensor, the fiducial marks while the fiducial marks are backlit by a light source; and
printing a registered mirrored copy of the image on the second side of the print medium using respective relative positions of at least some of the scanned fiducial marks to the image.

15. A printer comprising the non-transitory machine-readable medium of claim 14.

* * * * *